US012337329B2

(12) United States Patent
Bäcklund

(10) Patent No.: US 12,337,329 B2
(45) Date of Patent: Jun. 24, 2025

(54) METHOD AND APPARATUS FOR GRINDING AND DRYING A MATERIAL OR A MIXTURE OF MATERIALS

(71) Applicant: Airgrinder AB, Skelleftehamn (SE)

(72) Inventor: Erik Bäcklund, Skellefteå (SE)

(73) Assignee: Airgrinder AB, Skelleftehamn (SE)

( * ) Notice: Subject to any disclaimer, the term of this patent is extended or adjusted under 35 U.S.C. 154(b) by 526 days.

(21) Appl. No.: 17/437,712

(22) PCT Filed: Mar. 18, 2020

(86) PCT No.: PCT/SE2020/050286
§ 371 (c)(1),
(2) Date: Sep. 9, 2021

(87) PCT Pub. No.: WO2020/190202
PCT Pub. Date: Sep. 24, 2020

(65) Prior Publication Data

US 2022/0143622 A1 May 12, 2022

(30) Foreign Application Priority Data

Mar. 19, 2019 (SE) .................................... 1900051-2

(51) Int. Cl.

| | |
|---|---|
| ***B02C 19/06*** | (2006.01) |
| ***B02C 9/00*** | (2006.01) |
| ***B02C 19/00*** | (2006.01) |
| ***B02C 23/10*** | (2006.01) |
| ***B02C 23/24*** | (2006.01) |
| ***B02C 23/26*** | (2006.01) |
| ***B02C 23/34*** | (2006.01) |
| ***B04C 9/00*** | (2006.01) |
| ***F26B 1/00*** | (2006.01) |

(Continued)

(52) U.S. Cl.
CPC .............. *B02C 19/06* (2013.01); *B02C 23/10* (2013.01); *B02C 23/24* (2013.01); *B02C 23/26* (2013.01); *B02C 23/34* (2013.01); *F26B 1/005* (2013.01); *F26B 17/107* (2013.01)

(58) Field of Classification Search
CPC ......... B02C 23/10; B02C 23/24; B02C 23/26; B02C 23/32; B02C 23/34
USPC ................................... 241/19, 79.1; 209/723
See application file for complete search history.

(56) References Cited

U.S. PATENT DOCUMENTS 1,882,329 A * 10/1932 Kreisinger ................ F23K 1/00
55/432
3,794,251 A * 2/1974 Williams ................ B02C 23/26
241/65

(Continued)

FOREIGN PATENT DOCUMENTS

CN 109225546 A * 1/2019 ............... A23F 3/06
CN 112337195 A * 2/2021 ............. B01D 45/08

(Continued)

*Primary Examiner* — Mohammed S. Alawadi
(74) *Attorney, Agent, or Firm* — Blank Rome LLP

(57) ABSTRACT

The invention relates to a method for grinding and drying a material or material mixture (M), using a cyclone device (10) which communicates with an outlet line (52) for gas (G) and material (M) processed in the cyclone device (10), wherein at least a portion of the gas (G) and material (M) in the outlet line (52) are returned into a lower opening (14) of the cyclone device (10) for further cyclone treatment. The invention relates also to an apparatus.

11 Claims, 2 Drawing Sheets

(51) Int. Cl.

| | |
|---|---|
| ***F26B 3/10*** | (2006.01) |
| ***F26B 17/10*** | (2006.01) |
| ***F26B 21/04*** | (2006.01) |
| ***F26B 21/12*** | (2006.01) |

(56) References Cited

U.S. PATENT DOCUMENTS 4,061,274 A * 12/1977 Williams ................ B02C 23/32 241/19
4,113,187 A * 9/1978 Hoppen .................. B02C 21/00 241/24.31
4,498,633 A * 2/1985 Williams ................ B02C 23/34 241/60
4,637,556 A * 1/1987 Dunn ...................... B02C 23/32 241/79.1
4,726,531 A * 2/1988 Strasser .................. B02C 23/32 241/70
5,005,770 A * 4/1991 Suessegger ............. B07B 7/083 241/19
5,236,132 A 8/1993 Rowley, Jr.
5,839,673 A * 11/1998 Williams ................ B02C 23/34 241/31
5,850,977 A * 12/1998 Csendes ................ B02C 19/005 241/24.31
6,993,857 B2 * 2/2006 Coles ...................... B02C 19/06 432/15
7,523,831 B2 * 4/2009 Ottow ..................... B07B 7/083 209/710
2019/0015840 A1 * 1/2019 Wulfert ..................... B04C 5/28

FOREIGN PATENT DOCUMENTS

EP 1 337 346 B1 8/2003
GB 252835 A 6/1926
KR 102518267 B1 * 4/2023 ........... G08B 21/182
SU 1659111 A1 6/1991
WO WO 2007/060283 A1 5/2007

* cited by examiner

METHOD AND APPARATUS FOR GRINDING AND DRYING A MATERIAL OR A MIXTURE OF MATERIALS

The present invention relates to a method according to the preamble of claim 1. The invention also relates to an apparatus.

BACKGROUND OF THE INVENTION

In a variety of contexts, there is a great need to grind and dry different materials or mixtures of materials. As a non-limiting example, grinding and drying different types of material can be mentioned.

THE OBJECT OF THE INVENTION

An object of the invention is to provide a method and an apparatus which is very advantageous in grinding and drying various materials/material mixtures. This object is fulfilled by the invention having the features stated in the claims.

THE ADVANTAGES OF THE INVENTION

Among the many advantages of the invention it can be mentioned, inter alia, that extremely good grinding and drying results can be obtained requiring a very low energy consumption.

SHORT DESCRIPTION OF THE DRAWINGS

Figure 1:
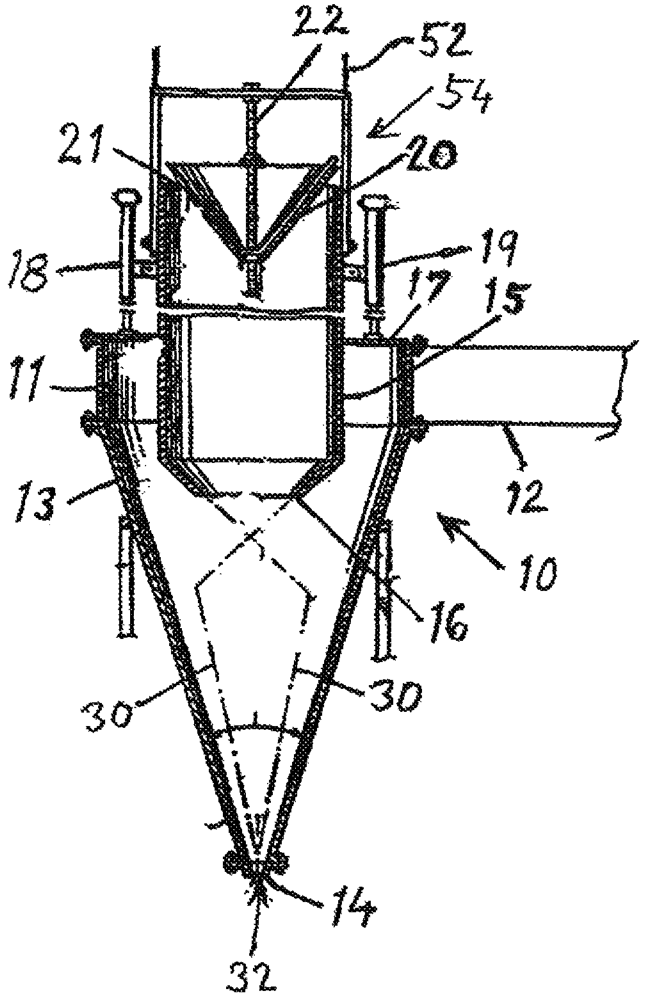
Figure 2:
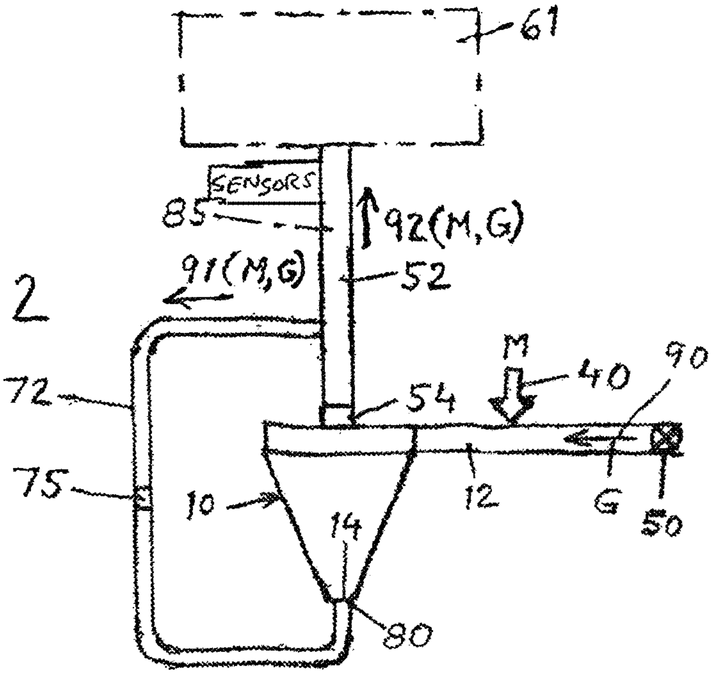
Figure 3:
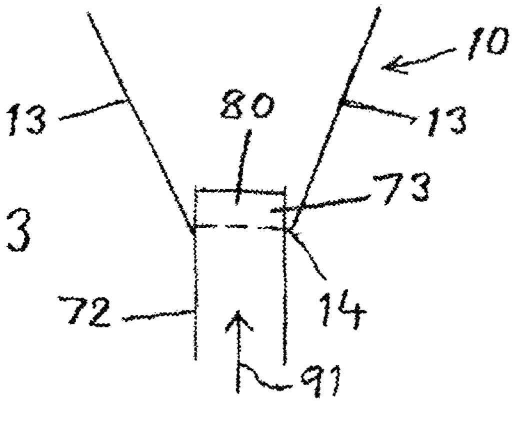

FIG. 1 is a schematic section through a cyclone device which can be used for carrying out the invention, FIG. 2 is a schematic illustration of the invention, FIG. 3 shows schematically an inlet for recirculation to the cyclone device.

DETAILED DESCRIPTION OF EMBODIMENTS

FIG. 1 shows a cyclone device 10 which can be used in the method according to the invention. It has a housing with a cylindrical portion 11 having a tangential inlet from an inlet line 12, and the cylindrical portion transforms into a conical portion 13 having a bottom outlet 14. A vortex collector in the form of a cylindrical tube 15 which can have a conical end 16 extends downwardly through a lid 17 of the cylindrical portion and act as an outlet to the atmosphere, for example. The axial position of the vortex collector may be set as indicated by the adjusting means 18, 19 which may be remote operable. A restriction for the outlet 52 is formed by a cone 20 so that an annular outlet slot 21 is formed, and this slot can be adjusted with a set screw 22 which is suitably remotely operable.

When air or other gas is blown by a fan, not shown, into the inlet line 12, a downward vortex is formed which then turns and forms a central ascending vortex which is trapped by the vortex collector. The dash dotted lines 30 indicate the boundary between overpressure on the outside and negative pressure on the inside of the lines.

The cyclone device 10 has a bottom outlet 14, wherein a material supplied together with the supply air (gas) in the inlet line 12 settles on the conical wall and travels downwardly along the wall and out through the outlet 14. As can be seen in the figure by the dash dotted lines 30, there is overpressure along the conical wall but negative pressure in the center of the outlet so that ambient air flows in, as indicated by the arrow 32. The cyclone device 10 and its properties are not described in detail since a cyclone device of this type is described in closer detail in U.S. Pat. No. 5,236,132. Reference is made to this document.

FIG. 2 shows schematically an illustration of an inventive arrangement.

A fan device 50 is provided at a free end portion of the inlet line 12 connected to the cyclone device 10. The fan device 50 is preferably adjustable in terms of blow capacity for adaptation to various modes of operation.

Between the fan device 50 and the cyclone device 10, a device 40 for variable input of a material M or material mixture is arranged.

Sometimes it may be convenient to arrange a valve (not shown) in the inlet line 12 to effect the flow rate, if necessary.

After the operating cycle in the cyclone device 10, air/gas G and grinded material/material mixture M exit through the adjustable restriction valve 54 and further into an outlet line 52 which leads to an end station 61 for transporting away grinded products, gas evacuation and liquid evacuation, etc. Recovery of thermal energy is also possible.

It should be mentioned that a certain amount of grinded material normally leaves the cyclone device 10 through its opening 14. This is normally not desirable due to, inter alia, disruption in logistics operations.

According to the present invention, a return feed line 72 is provided between the outlet line 52 and the opening 14 of the cyclone device 10. In the return feed line 72, a preferably remote-controlled valve 75 is provided for controlling gas and material flow upon return feed to the opening 14 of the cyclone device 10 which is now converted to a return feed inlet 80. The return feed line 72 is connected to the outlet line 52 after the valve 54, in view of the flow through said line. The arrows 90, 91, 92 show flow directions.

FIG. 3 shows an example of how a connection of the return feed line 72 to the lower opening 14 of the cyclone device 10, which now becomes a return feed inlet 80, can be formed. The end portion 73 of the return feed line is adapted regarding its design and size for intended cooperation with the opening 14 so that optimum interaction exists with the cyclone device 10. It is also possible to arrange vortex-forming means in connection with the end portion 73 of the return feed line.

It is also possible to design the connection of the return feed line to the lower end of the cyclone device so that a certain material discharge is still possible, if appropriate.

The inventive return feed line 72 enables a very advantageous recycling of gas and material/material mixtures to the bottom region of the cyclone device, which provides for a significant quality increase and energy saving as well as increased drying effect. The valve or valve assembly 75 in the return feed line may be closed when no recirculation is present and exhibit varying degree of opening depending on the desired degree of return.

It should be understood that the entire aforementioned process can be automated by providing a plurality of sensors/transducers or the like at appropriate locations. In that connection, the fan 50, the material supply device 40, and the valves 54 and 75, for example, can be controlled for optimal cooperation. It is also possible to provide a remote-controlled valve assembly 75 in line 52 after the inlet of the return feed line 72, in view of the flow through said line, for further control of the return amount, etc.

Thus, it will be understood that the valve assembly 75 can be remote controlled in a variety of ways. For example, the valve assembly 75 may comprise one or more actuators or control means (not shown) arranged to control the degree of opening or closing of valve assembly 75. Said actuators or control means can in turn be controlled remote by a control a device or a controller (not shown), for example, which is arranged to control valve assembly 75 directly or via said actuators or control means. The control can be done by wireless or wired electronic communication using appropriate communication protocols, or mechanical control arrangements, or other suitable control means and/or control devices.

The remote control of valve assembly 75 may be done so that valve assembly 75 is controlled from fully closed to fully open, or vice versa, depending on measurement results from the content of outlet line 52. Thus, the control device may be arranged to control the valve assembly 75 based on one or more measurement results, for example.

Said measurement results can be provided directly or indirectly to the control device by one or more sensors/transducers.

Furthermore, the valve assembly 75 may be arranged to be remote controlled completely steplessly/continuously or in discrete positions. This can be done from fully closed position/location to fully open position/location, or vice versa.

Possible preheating of the inlet gas G is of course possible, if desired, as well as functionally equivalent choice of components.

It is also convenient to provide equipment for controlling the system pressure of the gas G.

It should be understood that all process control is preferably automated by e.g. provision of required sensors and control means, etc.

The invention can, of course, be varied by replacement of functionally equivalent components.

Thus, the invention is not limited to what is shown and described, instead changes and modifications are, of course, possible within the scope of protection of the appended claims.

The invention claimed is:

1. A method for processing a material or a mixture of materials using a single cyclone device communicating with an outlet line for gas and material processed in the single cyclone device, the method comprising:

processing the material in the single cyclone device; and returning at least a portion of the gas in the outlet line directly into a lower opening of said single cyclone device via a return line extending between the outlet line and the lower opening of the single cyclone device for energy saving, wherein a rate of return of said gas is controlled by a valve assembly arranged in the return line.

2. The method according to claim 1, wherein the gas and material is supplied to the single cyclone device via a supply line which discharges into an upper region of the single cyclone device.

3. The method according to claim 1, wherein the valve assembly is remote controlled.

4. The method according to claim 3, wherein the valve assembly is remote controlled from fully closed to fully open, or vice versa, depending on measurement results from sensors.

5. The method according to claim 4, wherein the valve assembly is arranged to be remotely controlled in discrete positions.

6. An apparatus for processing a material or material mixture, the apparatus comprising:

a single cyclone device for processing the material, the single cyclone device communicating with an outlet line for gas and material, wherein a return line with a valve assembly is arranged between the outlet line and a lower opening of said single cyclone device, wherein at least a portion of the gas exiting the single cyclone device is returned directly into the lower opening of the single cyclone device via the return line for energy saving, and wherein a rate of return of said gas is controlled by the valve assembly in the return line.

7. The apparatus according to claim 6, wherein an end portion of the return line projects through the lower opening of the single cyclone device.

8. The apparatus according to claim 7, wherein a vortex-forming means is arranged at the end portion of the return line.

9. The apparatus according to claim 6, wherein the valve assembly is remote controlled.

10. The apparatus according to claim 9, wherein the valve assembly is remote controlled from fully closed to fully open, or vice versa, depending on measurement results from sensors located on the outlet line.

11. The apparatus according to claim 10, wherein the valve assembly is remote controlled or remote adjustable in discrete positions.

* * * * *